(12) United States Patent
Matsuo

(10) Patent No.: US 10,710,855 B2
(45) Date of Patent: Jul. 14, 2020

(54) HYDRAULIC DRIVING SYSTEM

(71) Applicant: KAWASAKI JUKOGYO KABUSHIKI KAISHA, Kobe-shi, Hyogo (JP)

(72) Inventor: Masahiro Matsuo, Akashi (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 0 days.

(21) Appl. No.: 16/311,051

(22) PCT Filed: Jun. 12, 2017

(86) PCT No.: PCT/JP2017/021654
§ 371 (c)(1),
(2) Date: Dec. 18, 2018

(87) PCT Pub. No.: WO2017/221758
PCT Pub. Date: Dec. 28, 2017

(65) Prior Publication Data
US 2019/0194006 A1    Jun. 27, 2019

(30) Foreign Application Priority Data
Jun. 20, 2016  (JP) .................................. 2016-121821

(51) Int. Cl.
*F15B 11/16* (2006.01)
*B66F 9/22* (2006.01)
(Continued)

(52) U.S. Cl.
CPC ................. *B66F 9/22* (2013.01); *B62D 5/065* (2013.01); *B62D 5/07* (2013.01); *F15B 11/165* (2013.01); *F15B 11/17* (2013.01); *F15B 2211/20553* (2013.01); *F15B 2211/20576* (2013.01); *F15B 2211/30555* (2013.01); *F15B 2211/30595* (2013.01); *F15B 2211/6054* (2013.01);
(Continued)

(58) Field of Classification Search
CPC ........ F15B 2211/6054; F15B 2211/781; F15B 11/165; F15B 11/17; B62D 5/075; B62D 5/07; B62D 5/065; B66F 9/22
See application file for complete search history.

(56) References Cited

U.S. PATENT DOCUMENTS 8,756,930 B2 *  6/2014  Johnson ................. B62D 5/075
                                                    60/430
2007/0234718 A1  10/2007  Vigholm
2011/0289908 A1  12/2011  Johnson et al.

FOREIGN PATENT DOCUMENTS

CN       102985703 A    3/2013
JP       2008-508483 A  3/2008
(Continued)

*Primary Examiner* — Abiy Teka
(74) *Attorney, Agent, or Firm* — Oliff PLC

(57) ABSTRACT

In a hydraulic driving system, a plurality of loading-line driving devices adjust a flow rate of an operating liquid flowing from a loading-line pump to a loading-line actuator, and a steering-line driving device adjusts a flow rate of the operating liquid flowing from the steering-line pump to the steering actuator. When one of a plurality of loading-line actuators is driving, a switching valve device connects a loading-side passage and a steering-side passage. When any of the plurality of loading-line actuators is not driving, the switching valve device disconnects the loading-side passage and the steering-side passage.

10 Claims, 4 Drawing Sheets

(51) Int. Cl.
  *F15B 11/17*   (2006.01)
  *B62D 5/065*   (2006.01)
  *B62D 5/07*    (2006.01)

(52) U.S. Cl.
  CPC .. *F15B 2211/6057* (2013.01); *F15B 2211/611* (2013.01); *F15B 2211/7142* (2013.01); *F15B 2211/781* (2013.01)

(56) References Cited

FOREIGN PATENT DOCUMENTS

| | | | |
|---|---|---|---|
| JP | 2010-76937 | A | 4/2010 |
| JP | 2013-532260 | A | 8/2013 |

* cited by examiner

HYDRAULIC DRIVING SYSTEM

TECHNICAL FIELD

The present invention relates to a hydraulic driving system configured to supply an operating liquid to a loading-line actuator and a steering actuator to drive the loading-line actuator and the steering actuator.

BACKGROUND ART

An industrial machinery, such as a forklift or a wheel loader, includes: a steering actuator configured to change a direction of the industrial machinery; and a loading-line actuator configured to move a fork, a bucket, and the like. A hydraulic driving system is connected to the steering actuator and the loading-line actuator and supplies operating oil to the steering actuator and the loading-line actuator to drive the steering actuator and the loading-line actuator. Known as one example of the hydraulic driving system is a hydraulic circuit device of PTL 1. The hydraulic circuit device includes two fixed displacement hydraulic pumps. One of the hydraulic pumps is connected to a steering cylinder through a steering-side passage, and a switching valve configured to control the flow rate of the operating oil flowing to the steering cylinder is interposed on the steering-side passage. The other of the hydraulic pumps is connected to a loading-line actuator through a loading-side passage, and a loading operating valve configured to control the flow rate of the operating oil flowing to the loading-line actuator is interposed on the loading-side passage. Further, a priority flow control valve is interposed on the steering-side passage so as to be located upstream of the switching valve. The priority flow control valve is configured to supply, to the loading-side passage, excess operating oil generated when the discharge amount of the pump exceeds the flow rate of the operating oil to be supplied to the steering actuator.

CITATION LIST

Patent Literature

PTL 1: Japanese Laid-Open Patent Application Publication No. 2010-76937

SUMMARY OF INVENTION

Technical Problem

In the hydraulic circuit device of PTL 1, the fixed displacement hydraulic pumps are adopted as hydraulic pumps configured to discharge the operating oil. Since the fixed displacement hydraulic pump discharges the operating oil at a constant flow rate at all times, the operating oil is discharged from the hydraulic pumps at an excessive flow rate, and this deteriorates energy efficiency. In order to improve the energy efficiency, for example, variable displacement hydraulic pumps may be adopted instead of the fixed displacement hydraulic pumps. In this case, the two variable displacement hydraulic pumps are configured to discharge the operating oil at respective flow rates corresponding to a load pressure of the steering cylinder and a load pressure of the loading-line actuator.

In the hydraulic circuit device configured as above, the priority flow control valve preferentially supplies the operating oil of one of the hydraulic pumps to the steering cylinder. Therefore, when the steering cylinder is driven in a state where only the loading-line actuator is being operated, the operating oil of the one of the hydraulic pumps is preferentially supplied to the steering cylinder. Further, since the one of the hydraulic pumps supplies the operating oil at the flow rate corresponding to the load pressure of the steering cylinder, it discharges the operating oil only at the flow rate necessary to drive the steering cylinder. Therefore, the flow rate of the operating oil supplied through the priority flow control valve to the loading-side passage significantly decreases. When the operation amount of an operating lever is large, the operating oil at the flow rate required with respect to the operation amount of the operating lever cannot be discharged only by the other of the hydraulic pumps. Therefore, the flow rate of the operating oil to be supplied to the loading-line actuator becomes low with respect to the operation amount of the operating lever. With this, an operating speed of the loading-line actuator significantly lowers, and a necessary operating speed cannot be secured.

An object of the present invention is to provide a hydraulic driving system capable to preventing an operating speed of a loading-line actuator from significantly decreasing even when a steering actuator is operated.

Solution to Problem

A hydraulic driving system of the present invention includes: a loading-line pump device configured to discharge an operating liquid at a flow rate corresponding to a first load sensing pressure signal input to the loading-line pump device; a loading-line driving device connected to one loading-line actuator or a plurality of loading-line actuators and also connected to the loading-line pump device through a loading-side passage, the loading-line driving device being configured to adjust a flow rate of the operating liquid flowing from the loading-line pump device to the one loading-line actuator or the plurality of loading-line actuators; a steering-line pump device configured to discharge the operating liquid at a flow rate corresponding to a second load sensing pressure signal input to the steering-line pump device; a steering-line driving device connected to a steering actuator and also connected to the steering-line pump device through a steering-side passage, the steering-line driving device being configured to adjust a flow rate of the operating liquid flowing from the steering-line pump device to the steering actuator; and a switching valve device configured to (i) connect the loading-side passage and the steering-side passage in a loading-line actuator operating state in which the one loading-line actuator operates or at least one of the plurality of loading-line actuators operates and (ii) disconnect the loading-side passage and the steering-side passage in a loading-line actuator stop state in which the one loading-line actuator does not operate or any of the plurality of loading-line actuators does not operate.

According to the present invention, in the loading-line actuator operating state, the connection between the steering-side passage and the loading-side passage is kept by the switching valve device. Therefore, even when the steering actuator is driven, a part of the operating oil discharged from the steering-line pump device can be supplied from the steering-side passage to the loading-side passage. With this, it is possible to prevent a case where when the steering actuator is driven in the loading-line actuator operating state, the steering-side passage and the loading-side passage are suddenly disconnected from each other, and the operating oil is not introduced from the steering-line pump device to the loading-side passage. To be specific, it is possible to prevent a case where when the steering actuator drives in the loading-line actuator operating state, the flow rate of the operating oil supplied to the loading-line actuator significantly decreases, and this significantly decreases the operating speed of the loading-line actuator.

In the above invention, the hydraulic driving system may include: a plurality of loading-line load pressure passages connected to the respective plurality of loading-line actuators; a steering-line load pressure passage connected to the steering actuator; and a load sensing device configured to in the loading-line actuator operating state, input a highest one of pressures of the plurality of loading-line load pressure passages and a pressure of the steering-line load pressure passage to the loading-line pump device as the first load sensing pressure signal and also input the highest one of the pressures of the plurality of loading-line load pressure passages and the pressure of the steering-line load pressure passage to the steering-line pump device as the second load sensing pressure signal, and in the loading-line actuator stop state, input a highest one of the pressures of the plurality of loading-line load pressure passages to the loading-line pump device as the first load sensing pressure signal and also input the highest one of the pressures of the plurality of loading-line load pressure passages and the pressure of the steering-line load pressure passage to the steering-line pump device as the second load sensing pressure signal.

According to the above configuration, in the loading-line actuator stop state, the flow rate of the operating oil discharged from the loading-line pump device can be suppressed to a minimum flow rate. Therefore, the energy loss of the loading-line pump device can be suppressed to a minimum level. On the other hand, when the steering actuator is driven in the loading-line actuator operating state, the highest one of the load pressures of the loading-line actuators and the load pressure of the steering actuator is input to the loading-line pump device as the first load sensing pressure signal, and also input to the steering-line pump device as the second load sensing pressure signal. Therefore, even when the loading-line actuator and the steering actuator drive at the same time, and the load pressure of the steering actuator becomes higher than the load pressure of the loading-line actuator, the operating oil can be discharged from the loading-line hydraulic pump device and the steering-line pump device at the flow rate corresponding to the load pressure of the steering actuator. On this account, even when the loading-line actuator and the steering actuator are driven at the same time, it is possible to prevent a case where the flow rate of the operating oil supplied to the loading-line actuator significantly lowers, and this significantly lowers the operating speed of the loading-line actuator.

In the above invention, the hydraulic driving system may be configured such that: the loading-line driving device includes a plurality of flow control mechanisms each having a pressure compensation function; the plurality of flow control mechanisms are associated with a respective plurality of operating devices; the plurality of flow control mechanisms are associated with the respective plurality of loading-line actuators; the plurality of flow control mechanisms include respective flow control valves and respective compensators; and each of the plurality of flow control mechanisms supplies the operating liquid to the associated loading-line actuator through the flow control valve and the compensator at a flow rate corresponding to an operation command output from the associated operating device.

According to the above configuration, even when the loading-line actuator and the steering actuator are driven at the same time, the operating oil at the flow rate corresponding to the operation command of the operating device can be supplied to the loading-line actuator associated with the operating device.

In the above invention, the hydraulic driving system may be configured such that: the steering-line driving device includes a steering valve and a steering-side compensator; and the steering-line driving device supplies the operating liquid from the steering-line pump device to the steering actuator through the steering valve and the steering-side compensator at a flow rate corresponding to an operation amount of an operation tool.

According to the above configuration, even when the loading-line actuator and the steering actuator are driven at the same time, the operating oil can be supplied to the steering actuator at the flow rate corresponding to the operation amount of the operation tool.

In the above invention, the hydraulic driving system may be configured such that: the steering-line driving device includes a relief valve; the steering-side compensator is connected to the relief valve and supplies to the relief valve a part of the operating liquid flowing through the steering-side passage; when a pressure of the operating liquid flowing through the relief valve becomes a relief pressure, the relief valve discharges to a tank the operating liquid flowing through the relief valve; and the relief pressure is set to be higher than an operating pressure by which the steering actuator operates.

According to the above configuration, when the operating oil is accumulated in the steering-side passage, and this increases the hydraulic pressure of the steering-side passage, the operating oil can be discharged.

Advantageous Effects of Invention

According to the present invention, even when a steering cylinder is operated in a state where a loading-line actuator is being operated, an operating speed of the loading actuator can be prevented from significantly decreasing.

The above object, other objects, features, and advantages of the present invention will be made clear by the following detailed explanation of preferred embodiments with reference to the attached drawings.

DESCRIPTION OF EMBODIMENTS

Hereinafter, hydraulic driving systems 1 and 1A according to Embodiments 1 and 2 of the present invention will be explained with reference to the drawings. It should be noted that directions stated in the following explanations are used for convenience of explanation, and directions and the like of components of the present invention are not limited.

Further, each of the hydraulic driving systems 1 and 1A explained below is just one embodiment of the present invention. Therefore, the present invention is not limited to the embodiments, and additions, deletions, and modifications may be made within the scope of the present invention.

Figure 1:
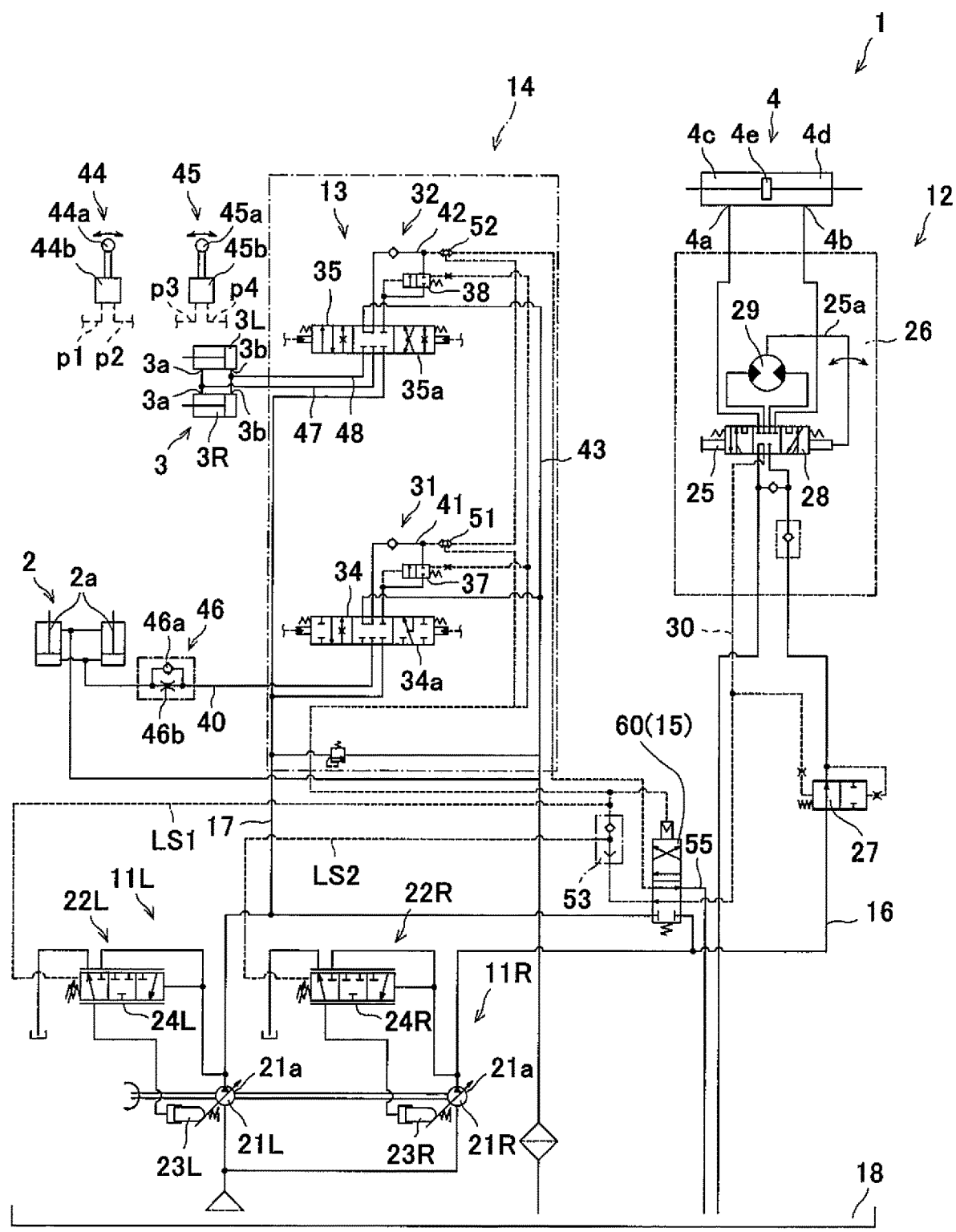
FIG. 1 is a circuit diagram showing the configuration of a hydraulic driving system according to Embodiment 1 of the present invention.

An industrial machinery, such as a forklift or a wheel loader, can travel while changing the direction of a vehicle body thereof by a steering actuator. Further, the industrial machinery includes an attachment, such as a bucket or a fork, and can move the attachment by a loading-line actuator to perform loading. To be specific, the industrial machinery can (i) move the attachment by the loading-line actuator, (ii) load a target object (such as a burden, earth, or sand) onto the attachment, (iii) travel to a desired position while changing the direction of the vehicle body by the steering cylinder, and (iv) unload the target object thereat. The industrial machinery configured as above includes a hydraulic driving system 1 shown in FIG. 1. The hydraulic driving system 1 supplies operating oil to actuators 2 to 4 to drive the actuator 2 to 4. The following will explain a case where a forklift that is one example of the industrial machinery is equipped with the hydraulic driving system 1.

Forklift

The forklift includes a plurality of actuators 2 to 4. In the present embodiment, the forklift includes three actuators that are a lifting actuator 2, a tilting actuator 3, and a steering actuator 4. The lifting actuator 2 is constituted by, for example, a pair of hydraulic cylinders and lifts and lowers a fork that is an attachment. The tilting actuator 3 is constituted by, for example, a pair of hydraulic cylinders 3L and 3R and expands and contracts to tilt the fork. The steering actuator 4 is constituted by, for example, a double-rod hydraulic cylinder and is configured to move a rod 4e to change the direction of rear wheels and thereby change a proceeding direction of the vehicle body. These three actuators 2 to 4 drive by being supplied with operating oil. In order to supply the operating oil to the three actuators 2 to 4, the forklift includes the hydraulic driving system 1.

Embodiment 1

The hydraulic driving system 1 of Embodiment 1 includes two pump devices 11L and 11R, a steering-line driving device 12, a loading-line driving device 13, a load sensing device 14, and a switching valve device 15. The two pump devices 11L and 11R are the same in configuration as each other. The following will mainly explain the configuration of a steering-line pump device 11R that is the pump device 11R. Regarding components of a loading-line pump device 11L that is the pump device 11L, the same reference signs including "L" instead of "R" are attached thereto, and detailed explanations thereof are omitted.

Pump Device

The steering-line pump device 11R includes a hydraulic pump 21R and a regulator 22R. The hydraulic pump 21R is a so-called variable displacement swash plate pump and can change a discharge capacity in accordance with a tilting angle of a swash plate 21a. The hydraulic pump 21R is provided with the regulator 22R, and the regulator 22R changes the tilting angle of the swash plate 21a in accordance with a pressure signal input to the regulator 22R. More specifically, the regulator 22R includes a servo piston 23R and a differential pressure spool 24R.

The servo piston 23R is coupled to the swash plate 21a, and the differential pressure spool 24R is connected to the servo piston 23R. The differential pressure spool 24R supplies and discharges pilot oil to and from the servo piston 23R. The servo piston 23R advances or retreats in accordance with the supply or discharge of the pilot oil to change the tilting angle of the swash plate 21a. A discharge pressure of the hydraulic pump 21R and a below-described pressure signal are applied to the differential pressure spool 24R so as to be opposed to each other, and the differential pressure spool 24R changes its position in accordance with a differential pressure therebetween. With this, the supply and discharge of the servo piston 23R is switched, and thus, a movement amount of the servo piston 23R, i.e., the tilting angle of the swash plate 21a is adjusted. The steering-line pump device 11R configured as above is connected to the steering-line driving device 12 through a steering-side passage 16, and the loading-line pump device 11L is connected to the loading-line driving device 13 through a loading-side passage 17.

Steering-Line Driving Device

Figure 2:
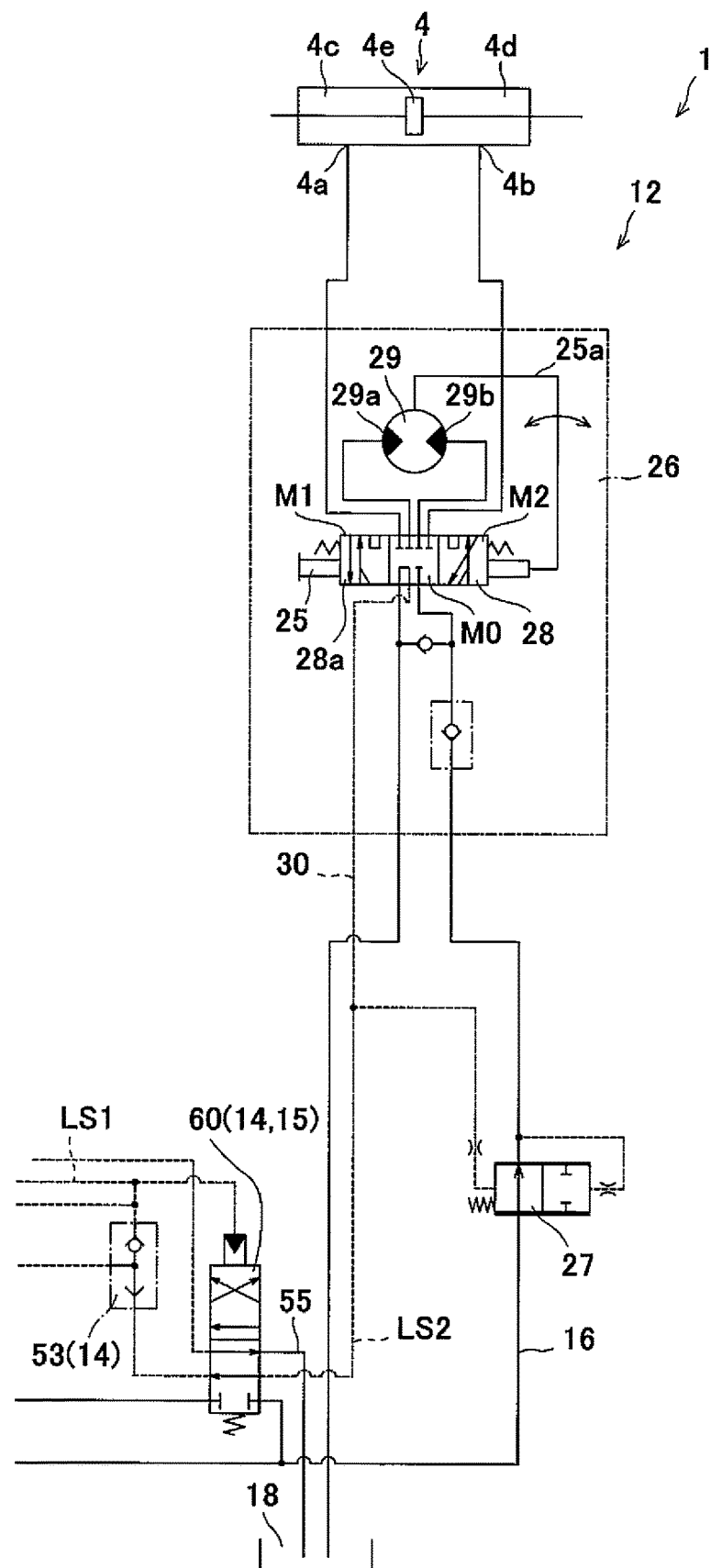
FIG. 2 is an enlarged circuit diagram showing a steering-line driving device included in the hydraulic driving system of FIG. 1.

As shown in FIG. 2, the steering-line driving device 12 includes a handle 25 that is one example of an operation tool. When the handle 25 is operated, the steering-line driving device 12 supplies the operating oil to the steering actuator 4 to change the proceeding direction of the vehicle body. The configuration of the steering-line driving device 12 will be specifically explained below. The steering-line driving device 12 includes the handle 25, an orbit roll 26, and a steering-side compensator 27.

The orbit roll 26 is connected to the steering-side passage 16 through the steering-side compensator 27 and includes a steering valve 28 and a metering mechanism 29. The steering valve 28 includes a steering spool 28a. The position of the steering spool 28a is changed by the handle 25 coupled to the steering spool 28a. The steering spool 28a switches the direction of the operating oil supplied to the steering actuator 4 by changing a position thereof and controls the flow rate of the operating oil in accordance with the position thereof.

More specifically, the steering valve 28 is connected to the steering-side passage 16, the metering mechanism 29, two ports 4a and 4b (first and second ports 4a and 4b) of the steering actuator 4, a tank 18, and a steering-side load sensing passage (a load pressure passage of the steering actuator) 30. When the handle 25 is located at a neutral position, the steering spool 28a is located at a neutral position M0, and all of the metering mechanism 29 and the two ports 4a and 4b of the steering actuator 4 are blocked. On the other hand, the steering-side load sensing passage 30 is connected to the tank 18. With this, the steering actuator 4 is kept at a neutral position. Thus, the vehicle body travels linearly, and a pressure of the steering-side load sensing passage 30 is reduced to a tank pressure.

Next, when the handle 25 is operated toward a first side in a rotational direction, the steering spool 28a moves to a first offset position M1. With this, the steering-side passage 16 is connected to the metering mechanism 29. The metering mechanism 29 is a so-called hydraulic pump and includes two ports 29a and 29b. The metering mechanism 29 is coupled to the handle 25 through a shaft 25a. When the handle 25 is operated toward the first side in the rotational direction, the metering mechanism 29 sucks the operating oil from the port 29a and discharges the operating oil through the port 29b at the flow rate corresponding to a rotating speed of the handle 25. The port 29b is connected to the second port 4b of the steering actuator 4 through the steering spool 28a. With this, the operating oil discharged from the metering mechanism 29 is supplied to a second oil chamber 4d of the steering actuator 4. The first port 4a of the steering actuator 4 is connected to the tank 18 through the steering spool 28a. The operating oil in a first oil chamber 4c of the steering actuator 4 is discharged to the tank 18. With this, the rod 4e of the steering actuator 4 can be moved toward a first side in a predetermined direction, and this can change the direction of the rear wheels.

When the handle 25 is operated toward a second side in the rotational direction, the steering spool 28a moves to a second offset position M2. With this, the steering-side passage 16 is connected to the port 29b of the metering mechanism 29. The port 29a is connected to the first port 4a of the steering actuator 4. With this, the operating oil discharged from the metering mechanism 29 is supplied to the first oil chamber 4c of the steering actuator 4. On the other hand, the second port 4b of the steering actuator 4 is connected to the tank 18 through the steering spool 28a, and the operating oil in the second oil chamber 4d of the steering actuator 4 is discharged to the tank 18. With this, the rod 4e of the steering actuator 4 can be moved to a second side in the predetermined direction, and this can change the direction of the rear wheels.

When the steering spool 28a configured as above is located at the neutral position M0, the steering spool 28a connects the steering-side load sensing passage 30 to the tank 18. When the steering spool 28a is located at each of the first and second offset positions M1 and M2, the steering spool 28a connects the steering-side load sensing passage 30 to the steering-side passage 16. With this, a steering-side load sensing pressure is output to the steering-side load sensing passage 30. The steering-side load sensing pressure is an outlet pressure of the steering valve 28, in other words, a load pressure of the steering actuator 4. Further, the steering-side load sensing passage 30 is connected to the steering-side compensator 27, and the steering-side load sensing pressure is applied to the steering-side compensator 27.

The steering-side compensator 27 is interposed on the steering-side passage 16. In addition to the steering-side load sensing pressure, the steering-side compensator 27 receives a downstream pressure of the steering-side compensator 27, i.e., an upstream pressure of the steering valve 28 such that the downstream pressure is opposed to the steering-side load sensing pressure. To be specific, pressures before and after the steering valve 28 act on the steering-side compensator 27 so as to be opposed to each other. In the present embodiment, the pressures before and after the steering valve 28 are applied to the steering-side compensator 27 through respective restrictors. By the cooperation of the steering-side compensator 27 and the steering-line driving device 12, the operating oil is supplied to the steering actuator 4 at the flow rate corresponding to an operation amount of the handle 25. Therefore, the steering-line pump device 11R is controlled to be tilted in accordance with a below-described second load sensing pressure signal LS2 and discharges the operating oil at such a flow rate that a pressure difference between upstream and downstream sides of the steering valve 28 becomes constant.

As above, the steering-line driving device 12 supplies the operating oil from the steering-line pump device 11R to the steering actuator 4 to drive the steering actuator 4.

Loading-Line Driving Device

Figure 3:
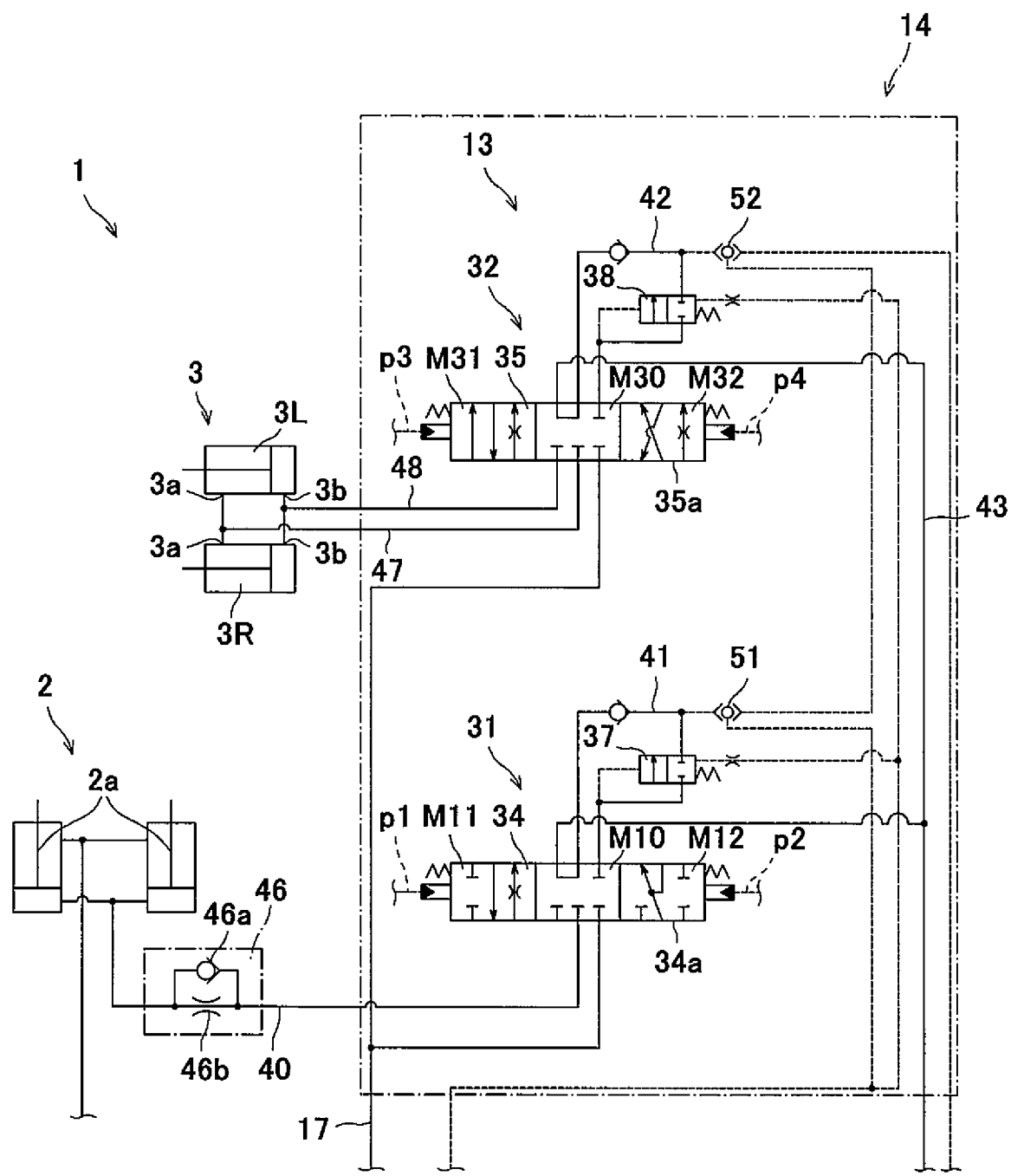
FIG. 3 is an enlarged circuit diagram showing a loading-line driving device included in the hydraulic driving system of FIG. 1.

As shown in FIG. 3, the loading-line driving device 13 supplies the operating oil to the lifting actuator 2 and the tilting actuator 3 to drive these actuators 2 and 3. More specifically, the loading-line driving device 13 includes two flow control mechanisms 31 and 32 each having a pressure compensation function. The two flow control mechanisms 31 and 32 are connected in parallel to a hydraulic pump 21L of the loading-line pump device 11L through the loading-side passage 17.

The two flow control mechanisms 31 and 32 are provided so as to be associated with the respective actuators 2 and 3. Regardless of load pressures of the actuators 2 and 3, the two flow control mechanisms 31 and 32 supply the operating oil to the respective actuators 2 and 3 at flow rates corresponding to operation commands input from below-described operating devices 44 and 45. To be specific, the flow control mechanism 31 includes a flow control valve 34 and a compensator 37, and the flow control mechanism 32 includes a flow control valve 35 and a compensator 38. The flow control valve 34 cooperates with the compensator 37 to supply the operating oil to the actuator 2 at a flow rate corresponding to an operation command (below-described pilot pressures p1 and p2) input to the flow control valve 34. The flow control valve 35 cooperates with the compensator 38 to supply the operating oil to the actuator 3 at a flow rate corresponding to an operation command (below-described pilot pressures p3 and p4) input to the flow control valve 35. The following will more specifically explain the configurations of the two flow control mechanisms 31 and 32.

A first flow control mechanism 31 that is one of the two flow control mechanisms 31 and 32 controls the direction of the operating oil flowing to the lifting actuator 2 to expand or contract the lifting actuator 2. To be specific, the first flow control mechanism 31 includes a first flow control valve 34 and a first compensator 37. The first flow control valve 34 is connected to the lifting actuator 2 through a lifting passage 40. The first flow control valve 34 is connected to upstream and downstream ends of a loading-side first load sensing passage 41. The first flow control valve 34 is connected to the tank 18 through a tank passage 43. The first flow control valve 34 includes a spool 34a and changes the position of the spool 34a to change connection statuses and opening degrees of the above-described passages. In order to change the position of the spool 34a, the lifting operating device 44 is connected to the first flow control valve 34.

The lifting operating device 44 includes an operating lever 44a and an operating valve 44b. The operating lever 44a is configured to be tiltable relative to the operating valve 44b toward a first side and second side in a predetermined direction. The operating valve 44b is configured to be able to output the pilot pressures p1 and p2 in directions (i.e., two directions) corresponding to respective tilting directions of the operating lever 44a. The first flow control valve 34 is connected in parallel to the operating valve 44b configured as above, and the pilot pressures p1 and p2 are applied to the spool 34a. These two pilot pressures p1 and p2 are applied to the spool 34a so as to be opposed to each other. Therefore, the spool 34a moves in a direction corresponding to the tilting direction of the operating lever 44a and switches the connection statuses of the loading-side passage 17 and the lifting passage 40 in accordance with the direction of the movement of the spool 34a.

More specifically, in the first flow control valve 34, when the operating lever 44a is located at the neutral position, the spool 34a is arranged at a neutral position M10. With this, the first flow control valve 34 blocks the loading-side passage 17, the lifting passage 40, and the upstream end of the loading-side first load sensing passage 41 and connects the downstream end of the loading-side first load sensing passage 41 to the tank passage 43. With this, the expansion and contraction of the lifting actuator 2 stop.

When the operating lever 44a is tilted toward the first side, the pilot pressure p1 is applied to the spool 34a, and the spool 34a moves to a first offset position M11. With this, the first flow control valve 34 connects the loading-side passage 17 to the upstream end of the loading-side first load sensing passage 41 and also connects the downstream end of the loading-side first load sensing passage 41 to the lifting passage 40. By the above-described connection statuses of the passages, the operating oil flowing from the loading-side passage 17 to the spool 34a is supplied to the lifting actuator 2 through the lifting passage 40. With this, the lifting actuator 2 expands, and the fork is lifted.

When the operating lever 44a is tilted toward the second side, the pilot pressure p2 is applied to the spool 34a, and the spool 34a moves to a second offset position M12. With this, the first flow control valve 34 disconnects the loading-side passage 17 and the upstream end of the loading-side first load sensing passage 41 and connects the downstream end of the loading-side first load sensing passage 41 and the lifting passage 40 to the tank passage 43. With this, the flow of the operating oil from the loading-side passage 17 through the spool 34a to the lifting passage 40 is stopped. In contrast, the operating oil of the lifting actuator 2 is discharged to the lifting passage 40 by the own weight of rods 2a to be discharged through the first flow control valve 34 to the tank passage 43. With this, the lifting actuator 2 can contract, and the fork can be lowered. A lowering speed limiting mechanism 46 constituted by a check valve 46a and a restrictor 46b is interposed on the lifting passage 40. Without limiting the lifting speed of the fork, only the lowering speed of the fork is limited by the lowering speed limiting mechanism 46.

The lifting operating device 44 outputs the pilot pressures p1 and p2 in accordance with operation directions of the operating lever 44a, and the first flow control valve 34 supplies the operating oil in a direction corresponding to the pilot pressure p1 or p2 to expand or contract the lifting actuator 2. The lifting operating device 44 outputs the pilot pressure p1 or p2 corresponding to an operation amount of the operating lever 44a. The spool 34a moves to a position corresponding to the pilot pressure p1 or p2 and connects each passage with an opening degree corresponding to the position. To be specific, the first flow control mechanism 31 acts such that the operating oil is supplied to the lifting passage 40 at a flow rate corresponding to the opening degree of the first flow control valve 34, i.e., a flow rate corresponding to the operation amount of the operating lever 44a. Therefore, the loading-line pump device 11L is controlled to be tilted in accordance with a below-described first load sensing pressure signal LS1 and discharges the operating oil at such a flow rate that a pressure difference between upstream and downstream sides of the first flow control valve 34 becomes constant. In order that the pressure difference before and after the first flow control valve 34 becomes constant even when the lifting actuator 2 and the tilting actuator 3 that is the other loading-line actuator operate at the same time, the first flow control mechanism 31 includes the first compensator 37.

The first compensator 37 is interposed on the loading-side first load sensing passage 41. A downstream pressure of the first flow control valve 34 and a below-described first selection pressure signal are input to the first compensator 37. The first compensator 37 acts such that the pressure difference before and after the first flow control valve 34 becomes substantially constant. Although the first selection pressure signal will be described later, the first selection pressure signal is a pressure signal which is input to a differential pressure spool 24L as the first load sensing pressure signal LS1 in order to control a discharge amount of the hydraulic pump 21L of the loading-line pump device 11L. The first selection pressure signal corresponds to a discharge pressure of the hydraulic pump 21L. With this, regardless of a change in the load pressure of the lifting actuator 2, the operating oil can be supplied from the first flow control mechanism 31 to the lifting passage 40 at a flow rate corresponding to the opening degree of each passage, i.e., a flow rate corresponding to the operation amount of the operating lever 44a.

As above, by supplying the operating oil from the flow control mechanism 31 to the lifting actuator 2 at the flow rate corresponding to the operation amount of the operating lever 44a, the lifting actuator 2 can be operated at an operating speed corresponding to the operation amount of the operating lever 44a. To be specific, the fork can be lifted and lowered at the operating speed corresponding to the operation amount of the operating lever 44a. In addition to the first flow control mechanism 31 which operates as above, the loading-line driving device 13 further includes a second flow control mechanism 32 that is one of the two flow control mechanisms. The second flow control mechanism 32 is connected to the loading-side passage 17 in parallel with the first flow control valve 34.

The second flow control mechanism 32 controls the direction of the operating oil flowing to the tilting actuator 3 to operate the tilting actuator 3. To be specific, as described above, the second flow control mechanism 32 includes the second flow control valve 35 and the second compensator 38. The second flow control valve 35 is connected to the tilting actuator 3. The tilting actuator 3 is constituted by the pair of cylinders 3L and 3R. The second flow control valve 35 is connected to head-side ports 3a of the cylinders 3L and 3R through a first tilting passage 47 and also connected to rod-side ports 3b of the cylinders 3L and 3R through a second tilting passage 48. The second flow control valve 35 is connected to upstream and downstream ends of a loading-side second load sensing passage (a load pressure passage of the loading-line actuator) 42 and also connected to the tank 18 through the tank passage 43.

The second flow control valve 35 includes a spool 35a and changes the position of the spool 35a to change the connection statuses and opening degrees of the above-described passages. In order to change the position of the spool 35a to change the connection statuses and opening degrees of the passages, the second flow control valve 35 is equipped with the tilting operating device 45.

The tilting operating device 45 is the same in configuration as the lifting operating device 44. The tilting operating device 45 includes an operating lever 45a and an operating valve 45b. The operating valve 45b outputs the pilot pressures p3 and p4 (operation command) in accordance with tilting directions of the operating lever 45a, the pilot pressures p3 and p4 each corresponding to a tilting amount of the operating lever 45a. The operating valve 45b is connected to the second flow control valve 35, and the pilot pressures p3 and p4 are applied to the spool 35a so as to be opposed to each other. Therefore, the spool 35a moves in a direction corresponding to the tilting direction of the operating lever 45a and connects the loading-side passage 17 to any one of the two tilting passages 47 and 48 and also connects the other of the two tilting passages 47 and 48 to the tank 18 in accordance with the direction of the movement of the spool 35a.

More specifically, in the second flow control valve 35, when the operating lever 45a is located at a neutral position, the spool 35a is arranged at a neutral position M20. With this, the loading-side passage 17, the first and second tilting passages 47 and 48, and the upstream end of the loading-side second load sensing passage 42 are blocked, and the operation of the tilting actuator stops. The downstream end of the loading-side second load sensing passage 42 is connected to the tank passage 43.

Next, when the operating lever 45a is tilted toward a first side, the pilot pressure p3 acts on the spool 35a, and the spool 35a moves to a first offset position M21. With this, the loading-side passage 17 and the upstream end of the loading-side second load sensing passage 42 are connected to each other. Further, the downstream end of the loading-side second load sensing passage 42 is connected to the first tilting passage 47, and the second tilting passage 48 is connected to the tank 18 through the tank passage 43. By the above connection statuses of the passages, the operating oil flowing through the loading-side passage 17 flows through the spool 35a to be supplied to the head-side ports 3a of the pair of cylinders 3L and 3R through the first tilting passage 47. On the other hand, the operating oil in the pair of cylinders 3L and 3R flows from the rod-side ports 3b through the second tilting passage 48 to be discharged through the spool 35a and the tank passage 43 to the tank 18. With this, the pair of cylinders 3L and 3R can be expanded, and the fork can be tilted to a first side.

When the operating lever 45a is tilted toward a second side, the pilot pressure p4 acts on the spool 35a, and the spool 35a moves to a second offset position M22. With this, the loading-side passage 17 and the upstream end of the loading-side second load sensing passage 42 are connected to each other. Further, the downstream end of the loading-side second load sensing passage 42 is connected to the second tilting passage 48, and the first tilting passage 47 is connected to the tank 18 through the tank passage 43. By the above connection statuses of the passages, the operating oil flowing from the loading-side passage 17 flows through the spool 35a to be supplied to the rod-side ports 3b of the pair of cylinders 3L and 3R through the second tilting passage 48. On the other hand, the operating oil in the pair of cylinders 3L and 3R flows from the head-side ports 3a through the first tilting passage 47 to be discharged through the spool 35a and the tank passage 43 to the tank 18. With this, the tilting actuator 3 can be contracted, and the fork can be tilted to a second side. Further, the operating oil of the tilting actuator 3 is introduced through the second flow control valve 35 to the loading-side second load sensing passage 42, and the hydraulic pressure of the loading-side second load sensing passage 42 becomes a hydraulic pressure corresponding to the load pressure of the lifting actuator 2.

As above, the tilting operating device 45 outputs the pilot pressures p3 and p4 in directions corresponding to operation directions of the operating lever 45a, and the second flow control valve 35 supplies the operating oil in a direction corresponding to the pilot pressure p3 or p4 to expand or contract the tilting actuator 3. The tilting operating device 45 outputs the pilot pressure p3 or p4 corresponding to an operation amount of the operating lever 45a. The spool 35a moves to a position corresponding to the pilot pressure p3 or p4 and connects each passage with an opening degree corresponding to the position. To be specific, the second flow control mechanism 32 supplies the operating oil to the first tilting passage 47 or the second tilting passage 48 at a flow rate corresponding to the opening degree, i.e., a flow rate corresponding to the operation amount of the operating lever 45a. Further, the loading-line pump device 11L is controlled to be tilted in accordance with the below-described first load sensing pressure signal LS1 and discharges the operating oil at such a flow rate that a pressure difference between upstream and downstream sides of the second flow control valve 35 becomes constant. In order that the pressure difference before and after the second flow control valve 35 becomes constant even when the tilting actuator 3 and the lifting actuator 2 that is the other loading-line actuator operate at the same time, the second flow control mechanism 32 includes the second compensator 38.

The second compensator 38 is interposed on the loading-side second load sensing passage 42 and has the same functions as the first compensator. To be specific, a downstream pressure of the second flow control valve 35 and the first selection pressure signal are input to the second compensator 38. The second compensator 38 acts such that the pressure difference before and after the second flow control valve 35 becomes substantially constant. With this, regardless of a change in the load pressure of the tilting actuator 3, the operating oil can be supplied from the second flow control mechanism 32 to the lifting passage 40 at a flow rate corresponding to the opening degree of each passage, i.e., a flow rate corresponding to the operation amount of the operating lever 45a.

As above, by supplying the operating oil from the second flow control mechanism 32 to the tilting actuator 3 at the flow rate corresponding to the operation amount of the operating lever 45a, the tilting actuator 3 can be operated at an operating speed corresponding to the operation amount of the operating lever 45a. To be specific, the fork can be tilted to the first side or the second side at the operating speed corresponding to the operation amount of the operating lever 45a.

As above, according to the hydraulic driving system 1, the actuators 2 and 3 are operated by the steering-line driving device 12 and the loading-line driving device 13 at operating speeds corresponding to the operation amounts of the operating levers 44a and 45a in directions corresponding to the operation directions of the operating levers 44a and 45a. Further, according to the hydraulic driving system 1, load sensing control is executed for the pump devices 11R and 11L such that the operating oil is introduced to the actuators 2 and 3 at the flow rates corresponding to the operation amounts of the operating levers 44a and 45a. In order to execute the load sensing control, the hydraulic driving system 1 includes the load sensing device 14 shown in FIG. 1.

Load Sensing Device

The load sensing device 14 performs comparison and selection of the load pressures of the actuators 2 to 4 to obtain the first and second load sensing pressure signals LS1 and LS2. The load sensing device 14 outputs the obtained first load sensing pressure signal LS1 to the loading-line pump device 11L and also outputs the obtained second load sensing pressure signal LS2 to the steering-line pump device 11R. The loading-line pump device 11L operates the regulator 22L to discharge the operating oil at the flow rate corresponding to the pressure signal LS1, and the steering-line pump device 11R operates the regulator 22R to discharge the operating oil at the flow rate corresponding to the pressure signal LS2. The load sensing device 14 configured as above includes two shuttle valves 51 and 52 and the switching valve device 15, and the switching valve device 15 includes a switching valve 60.

The first shuttle valve 51 is connected to the loading-side first load sensing passage 41 and the second shuttle valve 52, and the second shuttle valve 52 is connected to the loading-side first load sensing passage 41 and the switching valve 60 in addition to the first shuttle valve 51. The switching valve 60 is connected to the loading-side passage 17, the steering-side passage 16, the second shuttle valve 52, the steering-side load sensing passage 30, and a third shuttle valve 53. When the switching valve 60 is located at a neutral position, the switching valve 60 blocks the loading-side passage 17 and the steering-side passage 16, connects the second shuttle valve 52 to the tank 18, and also connects the third shuttle valve 53 to the steering-side load sensing passage 30. On the other hand, when the switching valve 60 is switched from the neutral position to a switched position, the switching valve 60 connects the loading-side passage 17 to the steering-side passage 16, connects the second shuttle valve 52 to the steering-side load sensing passage 30, and connects the third shuttle valve 53 to the tank 18. The third shuttle valve 53 is connected to the first shuttle valve 51 in addition to the switching valve 60. The third shuttle valve 53 compares an output pressure of the first shuttle valve 51 and an output pressure of the switching valve 60 and outputs the higher pressure as the second load sensing pressure signal LS2. The following will explain operations of the switching valve 60 and the load sensing device 14 when the switching valve 60 is located at each of the switched position and the neutral position (i.e., during a switching state and during a neutral state).

Operations of Switching Valve, Etc. During Switching State

First explained is a case where the actuator 2 and/or the actuator 3 operate (i.e., a loading-line actuator operating state), and the switching valve 60 is switched from the neutral position to the switched position (during the switching state). The switching valve 60 receives from the first shuttle valve 51 the first selection pressure signal that is the output pressure of the first shuttle valve 51. When the first selection pressure signal becomes a predetermined pressure or more, the switching valve 60 is switched from the neutral position to the switched position. To be specific, when the actuator 2 and/or the actuator 3 operate (i.e., the load pressure of the actuator 2 and/or the load pressure of the actuator 3 become high), the switching valve 60 is switched from the neutral position to the switched position. With this, the steering-side load sensing passage 30 and the second shuttle valve 52 are connected to each other, and the hydraulic pressure (i.e., the steering-side load sensing pressure) of the steering-side load sensing passage 30 is input to the second shuttle valve 52. At this time, the third shuttle valve 53 is connected through a tank passage 55 to the tank 18 by the switching valve 60.

Further, the second shuttle valve 52 is also connected to the loading-side second load sensing passage 42 in addition to the steering-side load sensing passage 30. To be specific, in addition to the hydraulic pressure of the steering-side load sensing passage 30, the hydraulic pressure (i.e., the load pressure of the tilting actuator 3) of the loading-side second load sensing passage 42 is input to the second shuttle valve 52. The second shuttle valve 52 compares the two input hydraulic pressures, i.e., the hydraulic pressure of the loading-side second load sensing passage 42 and the hydraulic pressure of the steering-side load sensing passage 30 and outputs the higher pressure to the first shuttle valve 51. The first shuttle valve 51 is connected to the loading-side first load sensing passage 41 in addition to the second shuttle valve 52. To be specific, in addition to the output pressure of the second shuttle valve 52, the hydraulic pressure (i.e., the load pressure of the lifting actuator 2) of the loading-side first load sensing passage 41 is input to the first shuttle valve 51. The first shuttle valve 51 compares the output pressure of the second shuttle valve 52 and the hydraulic pressure of the loading-side first load sensing passage 41 and outputs the higher pressure as the first selection pressure signal. The first selection pressure signal is applied to the switching valve 60 as described above and also applied to the differential pressure spool 24L of the loading-line pump device 11L as the first load sensing pressure signal LS1. Further, the first selection pressure signal is also output to the third shuttle valve 53.

The third shuttle valve 53 is connected through the switching valve 60 to the tank 18 in addition to the first shuttle valve 51. The first selection pressure signal and the tank pressure are input to the third shuttle valve 53. The third shuttle valve 53 selects the first selection pressure signal that is higher pressure and outputs the first selection pressure signal as a second selection pressure signal. The second selection pressure signal is applied to the differential pressure spool 24R of the steering-line pump device 11R as the second load sensing pressure signal LS2.

As above, the first load sensing pressure signal LS1 is applied to the differential pressure spool 24L of the loading-line pump device 11L, and the second load sensing pressure signal LS2 is applied to the differential pressure spool 24R of the steering-line pump device 11R. With this, the loading-line pump device 11L discharges the operating oil at the flow rate corresponding to the first load sensing pressure signal LS1, and the steering-line pump device 11R discharges the operating oil at the flow rate corresponding to the second load sensing pressure signal LS2. To be specific, while the actuator 2 and/or the actuator 3 are operating, the loading-line pump device 11L and the steering-line pump device 11R discharge the operating oil at necessary flow rates in accordance with the highest load pressure among the load pressures of the actuators 2 to 4.

The first selection pressure signal is also input to the loading-line driving device 13 to be applied to the first and second compensators 37 and 38. The first selection pressure signal is applied to the first compensator 37 so as to be opposed to the downstream pressure of the flow control valve 34 (i.e., the hydraulic pressure of the loading-side first load sensing passage 41). The first selection pressure signal is applied to the second compensators 38 so as to be opposed to the downstream pressure of the flow control valve 35 (i.e., the hydraulic pressure of the loading-side second load sensing passage 42). Therefore, when the actuator 2 and/or the actuator 3 are driven, the flow control mechanism 31 functions such that the pressure difference before and after the flow control valve 34 becomes constant, and the flow control mechanism 32 functions such that the pressure difference before and after the flow control valve 35 becomes constant.

As above, even when the highest pressure is any of the load pressures of the actuators 2 to 4, the pressure difference before and after the flow control valve 34 and the pressure difference before and after the flow control valve 35 are kept constant, and the operating oil can be supplied to the actuator 2 at the flow rate corresponding to the operation amount of the operating lever 44a of the operating device 44 and can be supplied to the actuator 3 at the flow rate corresponding to the operation amount of the operating lever 45a of the operating device 45. To be specific, regardless of the load pressures of the actuators 2 to 4, the actuator 2 can be driven at the operating speed corresponding to the operation amount of the operating lever 44a, and the actuator 3 can be driven at the operating speed corresponding to the operation amount of the operating lever 45a.

Operations of Switching Valve, Etc. During Neutral State

Next explained is a case where, for example, the actuators 2 and 3 stop (i.e., a loading-line actuator stop state), and the switching valve 60 is located at the neutral position (during the neutral state). As described above, when the first selection pressure signal becomes a predetermined pressure or more, the switching valve 60 operates, i.e., the switching valve 60 switches from the neutral position to the switched position. Therefore, when the actuators 2 and 3 are not operating, the switching valve 60 is kept at the neutral position. With this, the second shuttle valve 52 is connected to the tank 18 through the tank passage 55 by the switching valve 60, and the third shuttle valve 53 is connected to the steering-side load sensing passage 30. Thus, the tank pressure is input to the second shuttle valve 52, and the hydraulic pressure (i.e., the steering-side load sensing pressure) of the steering-side load sensing passage 30 is input to the third shuttle valve 53.

In addition to the hydraulic pressure of the steering-side load sensing passage 30, the first selection pressure signal selected as the higher pressure by the first shuttle valve 51 is input to the third shuttle valve 53. At this time, the first selection pressure signal becomes the tank pressure since (i) the actuators 2 and 3 do not operate, (ii) each of the load pressures of the actuators 2 and 3 becomes the tank pressure, and (iii) the tank pressure is also introduced to the second shuttle valve 52 through the switching valve 60. Therefore, when the handle 25 is operated, and this increases the hydraulic pressure of the steering-side load sensing passage 30, the third shuttle valve 53 outputs the hydraulic pressure of the steering-side load sensing passage 30 as the second selection pressure signal. The second selection pressure signal output as above is applied to the differential pressure spool 24R of the steering-line pump device 11R as the second load sensing pressure signal LS2. With this, the steering-line pump device 11R discharges the operating oil at the flow rate corresponding to the second load sensing pressure signal LS2 (i.e., the steering-side load sensing pressure). The loading-line pump device 11L also discharges the operating oil at the flow rate corresponding to the first load sensing pressure signal LS1. As described above, during the neutral state, since the actuators 2 and 3 stop, and the tank pressure is introduced to the second shuttle valve 52, the first selection pressure signal applied as the first load sensing pressure signal LS1 is the tank pressure. Therefore, the first load sensing pressure signal LS1 is in a low state, and the discharge amount of the loading-line pump device 11L is suppressed to a small amount.

As above, based on the load pressures of the actuators 2 to 4, the load sensing device 14 uses the switching valve 60 to output the first load sensing pressure signal LS1 to the loading-line pump device 11L and also output the second load sensing pressure signal LS2 to the steering-line pump device 11R.

Switching Valve Device

The switching valve 60 included in the switching valve device 15 switches connection and disconnection between the steering-side passage 16 and the loading-side passage 17 in accordance with the first selection pressure signal input to the switching valve 60. To be specific, when the actuator 2 and/or the actuator 3 operate, and the first selection pressure signal becomes a predetermined pressure or more, the steering-side passage 16 and the loading-side passage 17 are connected to each other. With this, the operating oil flowing through the steering-side passage 16 can flow to the loading-side passage 17. Thus, a large amount of operating oil flows to the actuators 2 and 3, and this can quickly move the actuators 2 and 3.

On the other hand, when, for example, the actuators 2 and 3 stop, and the first selection pressure signal becomes less than the predetermined pressure, the steering-side passage 16 and the loading-side passage 17 are disconnected from each other. With this, when the handle 25 is operated alone, and the second load sensing pressure signal LS2 that is the hydraulic pressure of the steering-side load sensing passage 30 is input to the steering-line pump device 11R, the operating oil is discharged from the steering-line pump device 11R only at the flow rate necessary to drive the steering actuator 4.

Operations of Hydraulic Driving System

Hereinafter, the operations of the hydraulic driving system 1 will be explained. In the hydraulic driving system 1, when the operating lever 44a of the lifting operating device 44 is operated, the operating oil is supplied to or discharged from the lifting actuator 2 through the loading-line driving device 13, and with this, the lifting actuator 2 expands or contracts. Further, when the operating lever 45a of the tilting operating device 45 is operated, the operating oil is supplied to or discharged from the tilting actuator 3 through the loading-line driving device 13, and with this, the tilting actuator 3 expands or contracts. As above, when at least one of the two operating levers 44a and 45a is operated (i.e., when at least one of the two actuators 2 and 3 is operated), a higher one of the load pressures of the two actuators 2 and 3 is selected as the first selection pressure signal by the load sensing device 14, and the first selection pressure signal is output to the switching valve 60. The first selection pressure signal is also output to the differential pressure spool 24L of the loading-line pump device 11L as the first load sensing pressure signal LS1.

When the switching valve 60 receives the first selection pressure signal, the switching valve 60 connects the second shuttle valve 52 to the steering-side load sensing passage 30. With this, the steering-side load sensing pressure is introduced to the second shuttle valve 52. When the handle 25 is not operated, the steering-side load sensing pressure is low, so that the steering-side load sensing pressure is not selected as the first selection pressure signal. To be specific, the higher one of the load pressures of the two actuators 2 and 3 is kept selected as the first selection pressure signal.

When the switching valve 60 receives the first selection pressure signal, the switching valve 60 connects the third shuttle valve 53 to the tank 18 through the tank passage 55 to introduce the tank pressure to the third shuttle valve 53. In addition to the tank pressure, the first selection pressure signal is introduced to the third shuttle valve 53. Therefore, the third shuttle valve 53 selects the first selection pressure signal as the second selection pressure signal. Then, the third shuttle valve 53 outputs the second selection pressure signal to the differential pressure spool 24R of the steering-line pump device 11R as the second load sensing pressure signal LS2.

As above, when the steering actuator 4 stops, and at least one of the two actuators 2 and 3 is operating, each of the first and second load sensing pressure signals LS1 and LS2 becomes the hydraulic pressure corresponding to a higher one of the load pressures of the two actuators 2 and 3, and the hydraulic pumps 21L and 21R of the pump devices 11L and 11R discharge the operating oil to the loading-side passage 17 and the steering-side passage 16, respectively, at the flow rate corresponding to the higher pressure. Further, when the switching valve 60 receives the first selection pressure signal, the switching valve 60 connects the steering-side passage 16 to the loading-side passage 17. By this connection, the operating oil discharged from the hydraulic pump 21R to the steering-side passage 16 can flow to the loading-side passage 17. With this, the operating oil can be supplied to the actuators 2 and 3 at a high flow rate.

Next explained is a case where when at least one of the actuators 2 and 3 is driving, the handle 25 is operated, and this drives the steering actuator 4. For example, when the handle 25 is operated toward the first side in the rotational direction, the steering spool 28a moves from the neutral position M0 to the first offset position M1. With this, the steering-side passage 16 is connected to the metering mechanism 29, and the operating oil flowing through the steering-side passage 16 is supplied to the second port 4b of the steering actuator 4 through the metering mechanism 29.

Simultaneously, the steering-side passage 16 is also connected to the steering-side load sensing passage 30, and with this, the steering-side load sensing pressure increases. The steering-side compensator 27 acts such that the pressure difference between the steering-side load sensing pressure and the upstream pressure of the steering valve 28 becomes constant, i.e., the pressure difference before and after the steering valve 28 becomes constant. With this, the operating oil flows from the steering valve 28 to the steering actuator 4 at the flow rate corresponding to the operation amount of the handle 25, and the steering actuator 4 operates at the operating speed corresponding to the operation amount of the handle 25.

Since at least one of the actuators 2 and 3 is driving, the switching valve 60 receives the first selection pressure signal, and the connection between the steering-side passage 16 and the loading-side passage 17 is being kept. With this, even when the steering actuator 4 is driven while at least one of the actuators 2 and 3 is driving, a part of the operating oil discharged from the steering-line pump device 11R can be supplied from the steering-side passage 16 to the loading-side passage 17. Therefore, even when the steering actuator 4 is driven while at least one of the actuators 2 and 3 is driving, it is possible to prevent a case where the connection between the steering-side passage 16 and the loading-side passage 17 is suddenly cut, and therefore, the operating oil is not introduced from the steering-line pump device 11R to the loading-side passage 17. Thus, even when the steering actuator 4 is driven while at least one of the actuators 2 and 3 is driving, it is possible to prevent a case where the operating oil supplied to the actuators 2 and 3 significantly decreases, and the operating speeds of the actuators 2 and 3 significantly decrease.

The steering-side load sensing passage 30 is connected to the third shuttle valve 53 through the switching valve 60. Therefore, when the steering-side load sensing pressure becomes higher than each of the load pressures of the actuators 2 and 3, the steering-side load sensing pressure is selected as the first selection pressure signal by the two shuttle valves 51 and 52. Further, the first selection pressure signal is selected as the second selection pressure signal by the third shuttle valve 53, and the second selection pressure signal is output to the steering-line pump device 11R as the second load sensing pressure signal LS2. With this, even when the steering-side load sensing pressure becomes higher than each of the load pressures of the actuators 2 and 3, the flow rate of the operating oil from the steering-line pump device 11R is secured, and the steering actuator 4 operates in accordance with the operation amount of the handle 25.

Further, the first selection pressure signal selected by the two shuttle valves 51 and 52 is output to the loading-line pump device 11L as the first load sensing pressure signal LS1. With this, even when the steering-side load sensing pressure becomes higher than each of the load pressures of the actuators 2 and 3, the loading-line pump device 11L can increase the discharge amount in accordance with the first load sensing pressure signal LS1, i.e., the steering-side load sensing pressure.

To be specific, when (i) the steering actuator 4 is driven while at least one of the actuators 2 and 3 is driving, and (ii) the steering-side load sensing pressure is higher than each of the load pressures of the actuators 2 and 3, the first load sensing pressure signal LS1 (i.e., the steering-side load sensing pressure) is input to the loading-line pump device 11L, and the second load sensing pressure signal LS2 (i.e., the steering-side load sensing pressure) is input to the steering-line pump device 11R. On this account, the flow rates of both of the pumps increase. Therefore, even when the flow rate of the operating oil from steering-line pump device 11R is distributed to the actuators 2 and 3 and the steering actuator 4, the operating speeds of the actuators 2 and 3 can be prevented from significantly decreasing.

Further explained is a case where the handle 25 is operated alone, and the steering actuator 4 is driven alone. When the handle 25 is operated alone, the steering spool 28a moves to a position corresponding to the rotational direction of the handle 25, and the rod 4e of the steering actuator 4 moves in a direction corresponding to the rotational direction. Simultaneously, the load pressure of the steering actuator 4 is introduced to the steering-side load sensing passage 30, and the steering-side compensator 27 controls the flow rate of the operating oil, flowing downstream of the steering-side compensator 27, in accordance with the load pressure of the steering actuator 4. Further, the load pressure of the steering actuator 4 is introduced to the switching valve 60 through the steering-side load sensing passage 30.

When the handle 25 is operated alone, the load pressures of the actuators 2 and 3 are low, and the first selection pressure signal is less than the predetermined pressure. Therefore, the switching valve 60 connects the second shuttle valve 52 to the tank 18 and also connects the steering-side load sensing passage 30 to the third shuttle valve 53. On this account, the first selection pressure signal output from the first shuttle valve 51 is kept in a low state, and the first load sensing pressure signal LS1 in a low state is input to the loading-line pump device 11L. Thus, the flow rate of the operating oil discharged from the loading-line pump device 11L can be set to a minimum flow rate. On the other hand, the second selection pressure signal output from the third shuttle valve 53 is the load pressure of the steering actuator 4, and the second load sensing pressure signal LS2 corresponding to the load pressure of the steering actuator 4 is input to the steering-line pump device 11R. Therefore, the operating oil can be discharged from the steering-line pump device 11R at the flow rate required by the steering actuator 4. With this, when the handle 25 is operated alone, the energy loss of the loading-line pump device 11L can be suppressed to a minimum level while operating the steering actuator 4 by the operating oil supplied from the steering-line pump device 11R.

According to the loading-line driving device 13 of the hydraulic driving system 1 configured as above, since the operating oil is supplied to the actuator 2 through the flow control mechanism 31 and also supplied to the actuator 3 through the flow control mechanism 32, the operating oil can be supplied to the actuator 2 at the flow rate corresponding to the operation amount of the operating lever 44a and also supplied to the actuator 3 at the flow rate corresponding to the operation amount of the operating lever 45a. For example, even when the steering actuator 4 is driven while at least one of the actuators 2 and 3 is being driven, the operating oil can be supplied to the actuator 2 at the flow rate corresponding to the operation amount of the operating lever 44*a* and also supplied to the actuator 3 at the flow rate corresponding to the operation amount of the operating lever 45*a*. Therefore, the steering actuator 4 and at least one of the actuators 2 and 3 can be driven at the same time without significantly spoiling operational feelings of the operating devices 44 and 45.

According to the steering-line driving device 12, since the operating oil is supplied to the steering actuator 4 through the steering-side compensator 27 and the steering valve 28, the operating oil can be supplied to the actuators 2 and 3 at the flow rate corresponding to the operation amount of the handle 25. Therefore, even when at least one of the actuators 2 and 3 is driven while the steering actuator 4 is being driven, the operating oil can be supplied to the steering actuator 4 at the flow rate corresponding to the operation amount of the handle 25. On this account, the steering actuator 4 and at least one of the actuators 2 and 3 can be driven at the same time without significantly spoiling the operational feeling of the handle 25.

Embodiment 2

The hydraulic driving system 1A of Embodiment 2 is similar in configuration to the driving system 1 of Embodiment 1. Therefore, the following will mainly explain components of the hydraulic driving system 1A of Embodiment 2 which are different from the components of the hydraulic driving system 1 of Embodiment 1. The same reference signs are used for the same components, and a repetition of the same explanation is avoided.

Figure 4:
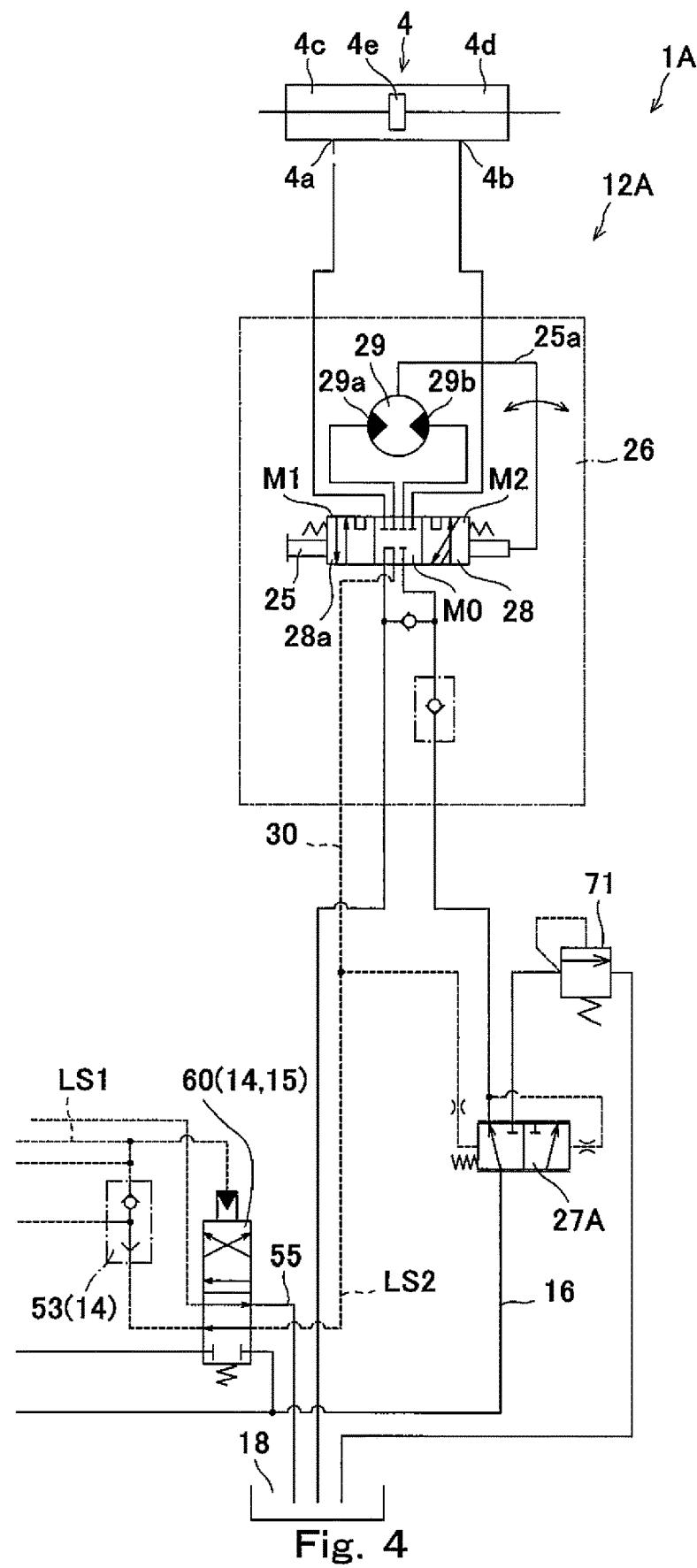
FIG. 4 is a circuit diagram showing the steering-line driving device of the hydraulic driving system according to Embodiment 2 of the present invention.

The hydraulic driving system 1A of Embodiment 2 includes a steering-line driving device 12A shown in FIG. 4, and the steering-line driving device 12A includes a priority valve 27A and a relief valve 71. The priority valve 27A is connected to the steering-side passage 16 and the orbit roll 26 and has the same functions as the steering-side compensator 27 of Embodiment 1. To be specific, the priority valve 27A is further connected to the steering-side load sensing passage 30. The hydraulic pressure of the steering-side load sensing passage 30 and a downstream pressure of the priority valve 27A (i.e., the upstream pressure of the steering valve 28) act on the priority valve 27A so as to be opposed to each other. The priority valve 27A functions such that the pressure difference between the hydraulic pressure of the steering-side load sensing passage 30 and the upstream pressure of the steering valve 28 becomes constant, i.e., the pressure difference before and after the steering valve 28 becomes constant.

The priority valve 27A is also connected to the relief valve 71 and connects the steering-side passage 16 to the relief valve 71 with an opening degree corresponding to the pressure difference before and after the steering valve 28. To be specific, the priority valve 27A can distribute to the relief valve 71 the operating oil flowing through the steering-side passage 16. When upstream pressure of the relief valve 71 becomes a predetermined relief pressure, the relief valve 71 discharges the operating oil, distributed from the steering-side passage 16, to the tank 18. The relief pressure is set to be higher than a maximum load pressure which may act on the steering actuator 4. When the operating oil is accumulated in the steering-side passage 16, and this increases the hydraulic pressure of the steering-side passage 16, the relief valve 71 can discharge the operating oil.

The hydraulic driving system 1A of Embodiment 2 configured as above has the same operational advantages as the hydraulic driving system 1 of Embodiment 1.

OTHER EMBODIMENTS

In each of the hydraulic driving systems 1 and 1A according to Embodiments 1 and 2, the first and second compensators 37 and 38 are interposed on the loading-side first and second load sensing passages 41 and 42, respectively, i.e., provided downstream of the first and second flow control valves 34 and 35, respectively. However, the positions of the first and second compensators 37 and 38 are not limited to these. For example, the first and second compensators 37 and 38 may be provided upstream of the first and second flow control valves 34 and 35, respectively. The first and second compensators 37 and 38 are only required to be arranged such that the pressure difference before and after the first flow control valve 34 becomes constant, and the pressure difference before and after the second flow control valve 35 becomes constant.

In each of the hydraulic driving systems 1 and 1A according to Embodiments 1 and 2, a highest one of the load pressures of the actuator 2 to 4 is selected as the first selection pressure signal. Therefore, if the load pressure of the steering actuator 4 becomes higher than each of the load pressures of the actuators 2 and 3 when the steering actuator 4 is driven, the loading-line pump device 11L discharges the operating oil at the flow rate corresponding to the load pressure of the steering actuator 4. Since the highest one of the load pressures of the actuator 2 to 4 is selected as the first selection pressure signal, the discharge amount of the loading-line pump device 11L is increased even if the flow rate of the operating oil flowing from the steering-side passage 16 to the loading-side passage 17 decreases. Therefore, the operating speeds of the actuators 2 and 3 can be prevented from decreasing. However, the present invention is not necessarily configured as above, and a higher one of the load pressures of the actuators 2 and 3 may be selected as the first selection pressure signal. In this case, even if the load pressure of the steering actuator 4 becomes higher than each of the load pressures of the actuators 2 and 3, and the flow rate of the operating oil flowing from the steering-side passage 16 to the loading-side passage 17 decreases, the discharge amount of the loading-line pump device 11L does not change, so that the operating speeds of the actuators 2 and 3 decrease slightly.

In each of the hydraulic driving systems 1 and 1A according to Embodiments 1 and 2, the switching valve 60 is constituted by a pilot switching valve but is not necessarily have to be constituted by a pilot switching valve. For example, an electromagnetic switching valve is adopted as the switching valve 60, and a sensor configured to be able to detect the operations of the operating levers 44*a* and 45*a* or the first selection pressure signal is used. Based on the detection result of the sensor, the switching valve 60 switches the connection statuses of the passages. Thus, the same operational advantages as the hydraulic driving systems 1 and 1A according to Embodiments 1 and 2 are obtained.

In each of the hydraulic driving systems 1 and 1A according to Embodiments 1 and 2, the two actuators 2 and 3 are included as actuators to be driven. However, the number of actuators may be one or three or more including, for example, a side shift actuator configured to move the fork laterally. Further, each of the hydraulic driving systems 1 and 1A according to Embodiments 1 and 2 is not limited to a forklift and is only required to be used in an industrial machinery, such as a wheel loader, including a steering actuator and the other loading-line actuator. Furthermore, in the hydraulic driving systems 1 and 1A according to Embodiments 1 and 2, the operating oil is used as an operating liquid. However, the operating liquid is not limited to the oil and is only required to be a liquid by which the steering actuator and the loading-line actuator can operate.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST

LS1 first load sensing pressure signal
LS2 second load sensing pressure signal
1, 1A hydraulic driving system
2 lifting actuator (loading-line actuator)
3 tilting actuator (loading-line actuator)
4 steering actuator
11L loading-line pump device
11R steering-line pump device
12 steering-line driving device
13 loading-line driving device
14 load sensing device
15 switching valve device
16 steering-side passage
17 loading-side passage
25 handle
27 steering-side compensator
27A priority valve (steering-side compensator)
28 steering valve
30 steering-side load sensing passage (steering-line load pressure passage)
31 first flow control mechanism having pressure compensation function
32 second flow control mechanism having pressure compensation function
34 flow control valve
35 flow control valve
37 first compensator
38 second compensator
41 loading-side first load sensing passage (loading-line load pressure passage)
42 loading-side second load sensing passage (loading-line load pressure passage)
60 switching valve
71 relief valve

The invention claimed is:

1. A hydraulic driving system comprising:
a loading-line pump device configured to discharge an operating liquid at a flow rate corresponding to a first load sensing pressure signal input to the loading-line pump device;
a loading-line driving device connected to one loading-line actuator or a plurality of loading-line actuators and also connected to the loading-line pump device through a loading-side passage, the loading-line driving device being configured to adjust a flow rate of the operating liquid flowing from the loading-line pump device to the one loading-line actuator or the plurality of loading-line actuators;
a steering-line pump device configured to discharge the operating liquid at a flow rate corresponding to a second load sensing pressure signal input to the steering-line pump device;
a steering-line driving device connected to a steering actuator and also connected to the steering-line pump device through a steering-side passage, the steering-line driving device being configured to adjust a flow rate of the operating liquid flowing from the steering-line pump device to the steering actuator; and
a switching valve device configured to (i) connect the loading-side passage and the steering-side passage when a load pressure of the one loading-line actuator or at least one of the plurality of loading-line actuators is equal to or higher than a predetermined pressure, and (ii) disconnect the loading-side passage and the steering-side passage when a load pressure of the one loading-line actuator or the plurality of loading-line actuators is less than the predetermined pressure.

2. The hydraulic driving system according to claim 1, comprising:
a plurality of loading-line load pressure passages connected to the respective plurality of loading-line actuators;
a steering-line load pressure passage connected to the steering actuator; and
a load sensing device configured to
in a loading-line actuator operating state in which the one loading-line actuator operates or at least one of the plurality of loading-line actuators operates, input a highest one of pressures of the plurality of loading-line load pressure passages and a pressure of the steering-line load pressure passage to the loading-line pump device as the first load sensing pressure signal and also input the highest one of the pressures of the plurality of loading-line load pressure passages and the pressure of the steering-line load pressure passage to the steering-line pump device as the second load sensing pressure signal, and
in a loading-line actuator stop state in which the one loading-line actuator does not operate or any of the plurality of loading-line actuators does not operate, input a highest one of the pressures of the plurality of loading-line load pressure passages to the loading-line pump device as the first load sensing pressure signal and also input the highest one of the pressures of the plurality of loading-line load pressure passages and the pressure of the steering-line load pressure passage to the steering-line pump device as the second load sensing pressure signal.

3. The hydraulic driving system according to claim 2, wherein:
the loading-line driving device includes a plurality of flow control mechanisms each having a pressure compensation function;
the plurality of flow control mechanisms are associated with a respective plurality of operating devices;
the plurality of flow control mechanisms are associated with the respective plurality of loading-line actuators;
the plurality of flow control mechanisms include respective flow control valves and respective compensators; and
each of the plurality of flow control mechanisms supplies the operating liquid to the associated loading-line actuator through the flow control valve and the compensator at a flow rate corresponding to an operation command output from the associated operating device.

4. The hydraulic driving system according to claim 3, wherein:
   the steering-line driving device includes a steering valve and a steering-side compensator; and
   the steering-line driving device supplies the operating liquid from the steering-line pump device to the steering actuator through the steering valve and the steering-side compensator at a flow rate corresponding to an operation amount of an operation tool.

5. The hydraulic driving system according to claim 4, wherein:
   the steering-line driving device includes a relief valve;
   the steering-side compensator is connected to the relief valve and supplies to the relief valve a part of the operating liquid flowing through the steering-side passage;
   when a pressure of the operating liquid flowing through the relief valve becomes a relief pressure, the relief valve discharges to a tank the operating liquid flowing through the relief valve; and
   the relief pressure is set to be higher than an operating pressure by which the steering actuator operates.

6. The hydraulic driving system according to claim 2, wherein:
   the steering-line driving device includes a steering valve and a steering-side compensator; and
   the steering-line driving device supplies the operating liquid from the steering-line pump device to the steering actuator through the steering valve and the steering-side compensator at a flow rate corresponding to an operation amount of an operation tool.

7. The hydraulic driving system according to claim 6, wherein:
   the steering-line driving device includes a relief valve;
   the steering-side compensator is connected to the relief valve and supplies to the relief valve a part of the operating liquid flowing through the steering-side passage;
   when a pressure of the operating liquid flowing through the relief valve becomes a relief pressure, the relief valve discharges to a tank the operating liquid flowing through the relief valve; and
   the relief pressure is set to be higher than an operating pressure by which the steering actuator operates.

8. The hydraulic driving system according to claim 1, wherein when the one loading-line actuator operates or at least one of the plurality of loading-line actuators operates, the load pressure is equal to or higher than the predetermined pressure such that the switching valve device is configured to connect the loading-side passage and the steering-side passage any time the one loading-line actuator operates or at least one of the plurality of loading-line actuators operates.

9. A hydraulic driving system comprising:
   a loading-line pump device configured to discharge an operating liquid at a flow rate corresponding to a first load sensing pressure signal input to the loading-line pump device;
   a loading-line driving device connected to one loading-line actuator or a plurality of loading-line actuators and also connected to the loading-line pump device through a loading-side passage, the loading-line driving device being configured to adjust a flow rate of the operating liquid flowing from the loading-line pump device to the one loading-line actuator or the plurality of loading-line actuators;
   one or a plurality of loading-line load pressure passages respectively connected to the one loading-line actuator or the plurality of loading-line actuators;
   a steering-line pump device configured to discharge the operating liquid at a flow rate corresponding to a second load sensing pressure signal input to the steering-line pump device;
   a steering-line driving device connected to a steering actuator and also connected to the steering-line pump device through a steering-side passage, the steering-line driving device being configured to adjust a flow rate of the operating liquid flowing from the steering-line pump device to the steering actuator;
   a steering-line load pressure passage connected to the steering actuator;
   a switching valve device configured to: (i) connect the loading-side passage and the steering-side passage in a loading-line actuator operating state in which the one loading-line actuator operates or at least one of the plurality of loading-line actuators operates and (ii) disconnect the loading-side passage and the steering-side passage in a loading-line actuator stop state in which the one loading-line actuator does not operate or any of the plurality of loading-line actuators does not operate; and
   a load sensing device configured to:
      in the loading-line actuator operating state, input a highest one of pressures of the one or plurality of loading-line load pressure passages and a pressure of the steering-line load pressure passage to the loading-line pump device as the first load sensing pressure signal and also input the highest one of the pressures of the one or plurality of loading-line load pressure passages and the pressure of the steering-line load pressure passage to the steering-line pump device as the second load sensing pressure signal, and
      in the loading-line actuator stop state, input the pressure of the one loading-line load pressure passage or a highest one of the pressures of the plurality of loading-line load pressure passages to the loading-line pump device as the first load sensing pressure signal and also input the highest one of the pressures of the one or plurality of loading-line load pressure passages and the pressure of the steering-line load pressure passage to the steering-line pump device as the second load sensing pressure signal.

10. A hydraulic driving system comprising:
   a loading-line pump device configured to discharge an operating liquid at a flow rate corresponding to a first load sensing pressure signal input to the loading-line pump device;
   a loading-line driving device connected to a plurality of loading-line actuators and also connected to the loading-line pump device through a loading-side passage, the loading-line driving device being configured to adjust a flow rate of the operating liquid flowing from the loading-line pump device to the plurality of loading-line actuators;
   a plurality of loading-line load pressure passages respectively connected to the plurality of loading-line actuators;
   a steering-line pump device configured to discharge the operating liquid at a flow rate corresponding to a second load sensing pressure signal input to the steering-line pump device;

a steering-line driving device connected to a steering actuator and also connected to the steering-line pump device through a steering-side passage, the steering-line driving device being configured to adjust a flow rate of the operating liquid flowing from the steering-line pump device to the steering actuator;

a steering-line load pressure passage connected to the steering actuator;

a switching valve device configured to (i) connect the loading-side passage and the steering-side passage in a loading-line actuator operating state in which at least one of the plurality of loading-line actuators operates and (ii) disconnect the loading-side passage and the steering-side passage in a loading-line actuator stop state in which the plurality of loading-line actuators do not operate; and a load sensing device configured to:
  in the loading-line actuator operating state, input a highest one of pressures of the plurality of loading-line load pressure passages and a pressure of the steering-line load pressure passage to the loading-line pump device as the first load sensing pressure signal and also input the highest one of the pressures of the plurality of loading-line load pressure passages and the pressure of the steering-line load pressure passage to the steering-line pump device as the second load sensing pressure signal, and
  in the loading-line actuator stop state, input a highest one of the pressures of the plurality of loading-line load pressure passages to the loading-line pump device as the first load sensing pressure signal and also input the highest one of the pressures of the plurality of loading-line load pressure passages and the pressure of the steering-line load pressure passage to the steering-line pump device as the second load sensing pressure signal.

* * * * *